3,013,091
VAPOR PHASE SEPARATION OF ORGANIC COMPOUNDS UTILIZING WERNER COMPLEXES
Raymond N. Fleck, Whittier, and Carlyle G. Wight, Fullerton, Calif., assignors to Union Oil Company of California, Los Angeles, Calif., a corporation of California
No Drawing. Filed Nov. 18, 1958, Ser. No. 774,590
28 Claims. (Cl. 260—674)

This invention relates to a method for separating organic compounds, and in particular concerns an improved process for the separation of aromatic compounds which have similar chemical and physical properties but which differ in molecular configuration.

The use of certain metallo-organic compounds in separating aromatic compounds from admixture with other organic compounds of different configuration is described by Schaeffer in U.S. Patent No. 2,798,891. In brief, the Schaeffer separation process consists in contacting the feed mixture in the liquid phase with a solid coordination compound of the type known as a "Werner complex" and consisting of one molecular proportion of a salt of a metal of atomic number greater than 12 coordinated with at least two molecular proportions of a heterocyclic nitrogen base, whereby there is obtained a solid product consisting of one or another of the aromatic components of the feed mixture in a relatively firm association with the Werner complex. Such solid product is mechanically separated from the non-associated components of the feed mixture, and is thereafter treated to recover the aromatic compound therefrom. It is presumed that the molecular structure and configuration of the Werner complex are such that during the contacting operation one or another of the aromatic components of the feed mixture becomes entrapped or occluded within the lattice of the Werner complex to form an association compound of the clathrate type. For this reason, the Werner complex employed is referred to as a "clathrate-former," and the solid association compound is referred to as a "clathrate." Similarly, compounds which are capable of forming clathrates with the clathrate-former are said to be "clathratable." While the Schaeffer process is inherently capable of effecting otherwise difficult separations, as heretofore practiced its adaptability to large-scale operation is somewhat limited. For example, it is difficult to utilize to the fullest extent the clathration capacity of the clathrate-former because of the difficulty in achieving complete and uniform contact between the liquid feed mixture and the solid clathrate-former. Also, the clathrated aromatic compounds have been recovered from the clathrate by methods, e.g., acid-treating and heating, which decompose the clathrate-former so that it cannot be re-employed in a subsequent cycle of operation.

It is accordingly an objective of the present invention to provide an improved process for separating mixtures of two or more organic compounds which are difficult to separate by ordinary physical or chemical methods.

Another objective is to provide an improved process for the separation of organic compounds via clathration with a Werner complex clathrate-former.

A further objective is to provide, in such a clathration process, improved means for forming the clathrate, as well as improved means for treating the latter to recover the clathrated component thereof.

Other and related objectives will be apparent from the following detailed description of the invention, and various advantages more specifically referred to herein will be apparent to those skilled in the art upon employment of the invention in practice.

We have now found that the foregoing objectives and their attendant advantages can be relaized by: (1) forming the clathrate by contacting the Werner complex clathrate-former with the feed mixture in the vapor phase, and (2) recovering the clathrated component of the clathrate by contacting the latter wih a gaseous or vaporized displacement exchange medium which is readily separable from said clathrated component. More particularly, we have found that clathratable aromatic compounds can be easily separated from organic mixtures comprising the same by (1) contacting the mixture in the vapor phase with a solid Werner complex hereinafter more fully described, whereby there is formed a solid feed clathrate rich in the selectively clathrated feed component; (2) separating the fed clathrate from the raffinate or non-clathrated phase; (3) contacting the separated feed clathrate with a clathratable displacement exchange fluid in the vapor phase to effect displacement of the selectively clathrated aromatic feed component; and (4) treating the resulting extract phase, enriched in the selectively clathrated fed component, to separate the displacement exchange fluid therefrom and obtain the selectively clathrated component of the feed mixture in isolated form. The two contacting operations, i.e., Steps (1) and (3) are carried out in the presence of a free heterocyclic nitrogen base. In commercial practice, the process is carried out in a cyclic manner with recycling of the displacement exchange fluid and the Werner complex clathrate-former.

The process of the invention is broadly applicable to any mixture of organic components which contain an aromatic compound differing in molecular configuration from the other components of the mixture. Ordinarily, of course, such mixtures are those which cannot conveniently be resolved by more conventional methods, e.g., fractional distillation, azeotropic distillation, fractional crystallization, etc. As is taught in the aforementioned Schaeffer patent, the present class of clathrate-formers display a marked preference for forming clathrates with aromatic compounds. The process is thus well adapted for separating aromatic compounds from admixture with aliphatic and naphthenic compounds, e.g., in treating petroleum hydrocarbon reformates to recover the aromatic components therefrom. The process is also well adapted to separating mixtures comprising substantially only aromatic compounds, e.g., mixtures of aromatic hydrocarbon isomers such as the alkylbenzenes, alkylnaphthalenes, alkylanthracenes, aryl-substituted benzenes, etc. as well as isomeric mixtures of aromatic compounds containing such functional groups as nitro, amino, halogen, hydroxyl, carbonyl, and the like. A particularly important field of utility lies in the separation of alkylbenzene isomers in which each of the alkyl groups contains from 1 to 4 carbon atoms, e.g., mixed xylenes, cymenes, etc. For the most part, the present clathrate-formers preferentially clathrate the para isomer, but by suitably modifying the structure of the clathrate-former such preference can be changed in favor of the meta and ortho isomers.

The Werner complex clathrate-formers employed in practicing the invention are characterized by the general formula:

$$X \cdot Z_y \cdot A_n$$

wherein X is a metal having an atomic number above 12, Z is a heterocyclic nitrogen base, A is a negative radical, $y$ is a number from 2 to 6, and $n$ is a number from 1 to 3. Such complexes and methods for preparing them are described in "Modern Aspects of Inorganic Chemistry" by Emelius and Anderson, and in "Textbook of Inorganic Chemistry," vol. X, by Sutherland. For the most part they are insoluble or only slightly soluble in water and hydrocarbons, and are moderately or readily soluble in halogenated hydrocarbons, ethers, esters, ketones, aldehydes, etc. According to one mode of preparation, such complexes are prepared in solid form by adding from two to six molecular equivalents of the heterocyclic nitrogen base ("Z" in the above formula) to an aqueous solution containing one molecular equivalent of a metal salt comprised of the "X" and "A" components. The insoluble complex precipitates, and is filtered off and dried, preferably in a stream of air at room temperature or slightly above. Other methods of preparation are described in the afore-mentioned Shaeffer patent.

As stated, the metallic component of the complex ("X" in the above formula) may be any metal having an atomic number above 12. This includes primarily the metals of groups Ib, IIb, VIb, VIIb, and VIII of the periodic table, for example, iron, cobalt, nickel, copper, zinc, cadmium, silver, manganese, chromium, mercury, and molybdenum. Aluminum may also be used in some instances. The preferred metals are those of atomic number 25 to 28, inclusive, i.e., manganese, iron, cobalt and nickel.

The "A" component in the above general formula may be any negative radical, for example, thiocyanate $SCN^-$, isothiocyanate $NCS^-$, azide $NNN^-$, cyanate $NCO^-$, isocyanate $OCN^-$, cyanide $CN^-$, sulfate $SO_4^=$, nitrate $NO_3^-$, nitrite $ONO^-$, chloride $Cl^-$, bromide $Br^-$, iodide $I^-$, phosphate $PO_4^\equiv$, formate $HCOO^-$, acetate $$CH_3COO^-$$

and the like. A group of negative radicals found to be particularly effective for the present purposes consists of the thiocyanate, isothiocyanate, azide, cyanate, isocyanate and cyanide radicals. However, any radical may be utilized which is capable of producing a crystalline coordination complex with the above metal and a heterocyclic nitrogen base.

The "Z" component in the above formula may be any heterocyclic nitrogen base, and is selected to give a maximum selective clathration for the particular isomer which is to be clathrated into the crystal lattice of the complex. For example, if it is desired to clathrate para-xylene, a suitable nitrogen base is gamma-picoline. Not all nitrogen bases are equally effective in forming complexes which will clathrate the desired component. For example, the beta-picoline complex with nickel thiocyanate is not as effective as the gamma-picoline complex for clathrating para-xylene, presumably because of the steric effects of the 3-methyl group. However, the beta-picoline complex may be used advantageously for clathrating other compounds. The nitrogen base should, therefore, be selected by a judicious combination of theoretical reasoning and actual testing of the complexes with the particular mixture to be separated. The overall molecular dimensions of the nitrogen base should in most cases approximate the molecular dimensions of the compound to be clathrated in the complex. A particularly preferred class of bases comprises the heterocyclic resonance-stabilized compounds which contain one to three hetero-N atoms. Suitable examples include pyridine, the picolines, pyrrole, pyrazole, trizole, quinoline, the quinaldines, isoquinoline, pyrimidine, pyrazine, pyridazine, and substituted derivatives of such compounds. Of this preferred class, a sub-group which is particularly versatile and useful comprises the substituted pyridines, and especially the 4-substituted, the 3-substituted, and the 3,4-disubstituted pyridines. These compounds are sufficiently strong bases to form relatively stable Werner complexes, and the resulting complexes are capable of selectively forming clathrates with a wide variety of organic compounds. Examples of some of the substituted pyridines which are suitable in the process of this invention are 4-methyl-pyridine, 4-isopropyl-pyridine, 4-chloro-pyridine, 3-methyl-pyridine, 3-hydroxy-pyridine, 3-methyl-4-ethyl-pyridine, 4-fluoro-pyridine, 3-methoxy-pyridine, 3,4-dimethyl-pyridine, 3-acetyl-pyridine, 4-octyl-pyridine, and the like. Many other examples could be cited as will be apparent to those skilled in the art, and the complexes may include only one such base or a mixture of two or more bases in which case a mixed complex is formed. Other suitable pyridines are disclosed in U.S. Patent No. 2,798,891.

Examples of suitable complexes which may be employed corresponding to the formula above, are as follows:

[Ni(gamma-picoline)$_4$(SCN)$_2$]
[Cu(gamma-picoline)$_4$(SCN)$_2$]
[Hg(gamma-picoline)$_4$(NNN)$_2$]
[Ni(1-hexylamine)$_6$(SCN)$_2$]
[Co(pyridine)$_4$(OCN)$_2$]
[Fe(pyrrole)$_4$(SCN)$_2$]
[Cd(gamma-picoline)$_4$(CN)$_2$]
[Ag(gamma-picoline)$_2$(NNN)]
[Zn(aniline)$_4$(CN)$_2$]
[Cr(pyridine)$_4$SO$_4$]
[Ti(isoquinoline)$_3$(NH$_3$)$_3$(C$_2$O$_4$)$_2$]
[Ni(4-methylpyridine)$_4$Cl$_2$]
[Ni(4-methylpyridine)$_4$(NNN)$_2$]
[Ni(4-n-propylpyridine)$_4$(SCN)$_2$]
[Ni(4-cyanopyridine)$_4$(SCN)$_2$]
[Ni(methylisonicotinate)$_4$(SCN)$_2$]
[Ni(4-methylpyridine)$_4$(HCOO)$_2$]
[Ni(isonicotinamide)$_4$(SCN)$_2$]
[Ni(3-bromopyridine)$_4$(SCN)$_2$]
[Ni(isothionicotinamide)$_4$(SCN)$_2$]
[Ni(hexamethylenetetramine)$_2$(SCN)$_2$]
[Ni(isoquinoline)$_4$Cl$_2$]
[Ni(4-methylpyridine)$_4$Br$_2$]
[Mn(4-methylpyridine)$_4$(SCN)$_2$]
[Mn(isoquinoline)$_4$(SCN)$_2$]
[Zn(4-methylpyridine)$_4$Cl$_2$]
[Ni(4-ethylpyridine)$_4$(SCN)$_2$]
[Co(4-ethylpyridine)$_4$(SCN)$_2$]
[Fe(4-ethylpyridine)$_4$(SCN)$_2$]
[Mn(4-ethylpyridine)$_4$(SCN)$_2$]
[Ni(4-hydroxymethylpyridine)$_4$(SCN)$_2$]
[Ni(4-β-hydroxyisopropylpyridine)$_4$(SCN)$_2$]
[Ni(3,4-dihydroxymethylpyridine)$_4$(SCN)$_2$]
[Mn(4-β-hydroxyisopropylpyridine)$_4$(ONO)$_2$]
[Co(3-α-hydroxyethylpyridine)$_4$(HCOO)$_2$]
[Ni(4-aminopyridine)$_4$(SCN)$_2$]
[Ni(4-benzylpyridine)$_4$(SCN)$_2$]
[Ni(3-aminopyridine)$_4$(SCN)$_2$]
[Ni(3,4-dibromopyridine)(SCN)$_2$]

Obviously, many other compounds similar to the above can be employed, not all of which give optimum separation of all isomer pairs, but which are selected to meet the specific pecularities of the feed mixtures to be resolved.

As previously stated, the contacting operations of the present process are carried out in the presence of a free heterocyclic nitrogen base, i.e., in the presence of heterocyclic nitrogen base in addition to that contained in the Werner complex. Any of the heterocyclic nitrogen bases previously mentioned may be employed, but it is usually preferred to employ the same base as that contained in the Werner complex. It has been found that by employing an excess of nitrogen base, over and above the stoichiometric proportion necessary for the chemical make-up of the active Werner complex, a substantial improvement is obtained in the weight-for-weight capacity of the complex for vapor phase clathrating the more readily clathratable components of the feed mixture. Moreover, in some cases the selectivity of the clathrate-former is also improved.

The amount of free nitrogen base employed may vary widely. Any increment over the stoichiometric amount required to yield the desired complex is beneficial. Suitable proportions range between about 0.01 and 10 parts per part of complex by weight, and preferably between about 0.1 and about 0.6 part per part of complex. The optimum proportion will vary somewhat for each particular complex, and for the clathration procedure employed. In each case, however, the optimum proportion may be easily determined by simply measuring the clathrating capacity of a graduated series of mixtures containing varying proportions of nitrogen base, and interpolating or extrapolating to define the optimum mixture, i.e., the mixture with minimum excess nitrogen base which will clathrate the largest weight ratio of the particular feed component.

The displacement exchange medium which is employed to recover the selectively clathrated component of the feed mixture may be any clathratable aromatic compound which is readily separated, e.g., by distillation, crystallization, absorption or other conventional means, from the various components of the feed mixture. Preferably, the displacement exchange medium is one having a boiling point or boiling range substantially outside the boiling range of the feed mixture and is clathratable to substantially the same extent as the selectively clathrated component of the feed mixture. Benzene, toluene, chlorotoluene, the xylenes, thiophene and alkylthiophenes are preferred.

Considering now the actual process operations, the initial step consists in contacting the feed mixture in the vapor phase and in the presence of free heterocyclic nitrogen base with a clathrate-former which, in a single pass operation, is one of the Werner complexes hereinbefore defined, but, in a cyclic operation, is a Werner complex in clathrated association with the displacement exchange medium employed in the previous operational cycle.

The amount of clathrate-former employed, relative to the feed mixture, depends upon its specific capacity for clathrating the particular clathratable compound concerned, and also upon the proportion of that compound present in the original mixture as well as upon the temperature of clathration. The present clathrate-formers are found in general to be capable of clathrating between about 5 percent to about 70 percent by weight of clathratable compounds. Optimum efficiency may require that more or less than this "stoichiometric" amount of clathrate-former be employed, depending upon its relative capacity for other components in the mixture to be resolved, and the number of cycles or stages which are permissible. In general, the amount of clathrate-former to be employed may vary between about 0.25 and 20 parts by weight per part of clathratable component in the mixture. Smaller proportions of the clathrate-former will generally yield a purer clathrate, while the larger proportions result in more complete removal of clathrate from the feed mixture on the basis of a single-stage batch operation.

The free heterocyclic nitrogen base is conveniently vaporized and added to the vaporized feed mixture prior to introduction of the latter into the contacting zone, but if desired it may be introduced thereinto as a separate stream.

The initial contacting operation produces (1) a solid feed clathrate consisting of the Werner complex in clathrated association with the selectively clathrated aromatic component of the feed mixture, and (2) a vapor phase raffinate comprising the non-clathrated components of the feed mixture and the free heterocyclic nitrogen base. In a cyclic operation, wherein the clathrate-former is itself a clathrate consisting of the Werner complex and the displacement exchange medium from a previous cycle of operation, the raffinate product will also contain said displacement exchange medium. After separating the raffinate product from the solid feed clathrate, the raffinate is treated, preferably by distillation, to separate the free heterocyclic base (and the displacement exchange medium, if present) from the non-clathrated components of the feed for re-use in the process.

The second contacting operation consists in contacting the solid feed clathrate with a gaseous or vaporized displacement exchange medium in the presence of free heterocyclic nitrogen base (which is preferably, but not necessarily, the same as that employed in the first contacting operation described above), whereby the clathrated component of the feed mixture is displaced by, and exchanged for, the displacement exchange fluid, and there is produced: (1) a solid displacement exchange clathrate consisting of the Werner complex in clathrated association with the displacement exchange medium, and (2) a gaseous extract product comprising the selectively clathratable component of the feed mixture, excess displacement exchange fluid, and the free heterocyclic nitrogen base. After separation of the extract product from the solid displacement exchange clathrate, the extract product is treated, preferably by distillation, to separate the displacement exchange fluid and free heterocyclic nitrogen base for re-use in the process and to obtain the selectively clathrated aromatic component of the feed mixture in isolated form. When operating in a cyclic manner, the solid displacement exchange clathrate is employed to treat the feed mixture in the next succeeding cycle of operation.

The contacting operations described above may be carried out under any combination of temperature and pressure conditions at which the Werner complex and the clathrate formed therewith is stable and at which the feed mixture and displacement exchange medium exist in the vapor phase. Thus, the temperature may vary from as low as $-50°$ C. to as high as $250°$ C., with appropriate adjustment of the pressure. Atmospheric temperatures are preferred. It is also preferred to carry out both contacting operations at substantially the same temperature and pressure.

The separation of the free heterocyclic nitrogen base from the raffinate and extract products may be accomplished by a number of conventional techniques. For example, in the vapor phase clathration separation of xylene isomers with gamma-picoline as the nitrogen base, either the raffinate or the extract product can be extractively distilled with water to yield an overhead product comprising water and xylene and a bottoms product comprising water and gamma-picoline. The bottoms are then extractively distilled with the incoming feed which results in an overhead product comprising water and xylenes and a bottoms product comprising xylenes and gamma-picoline. Thus, the gamma-picoline has been transferred from a product stream to the feed stream. Another alternate in the above-mentioned raffinate or extract product separation entails the selective adsorption of the gamma-picoline on a suitable adsorbent, such as "Molecular Sieves 13X," calcium chloride, silica gel and alumina, resulting in a xylene product substantially free of gamma-picoline. Conventional desorption techniques, e.g., heat, reduction of pressure, stripping gases, displacement exchange fluids, or a combination of these, recover the gamma-picoline from the adsorbent for reuse in the vapor phase clathration process. A particularly advantageous displacement exchange fluid is the feed stream itself, thus the gamma-picoline is effectively transferred from the effluent product streams to the incoming feed.

The following examples, in which the volumes referred to are liquid volumes, specifically illustrate the practice of the invention.

EXAMPLE I

A clathrate bed of nickel tetra gamma-picoline dithiocyanate clathrated with thiophene is contacted with 150 volumes of a feed mixture consisting of mixed xylenes (27% para, 69% meta, 4% ortho) in admixture with 75 volumes of gamma-picoline. The xylene feed mixture and the excess nitrogen base is passed in vapor phase over the said clathrate bed at about $200°$ C. and an absolute pressure of about 130 mm. The effluent or raffinate phase contains about 50 volumes (approximate capacity of the clathrate bed) of displaced thiophene and a xylenegamma-picoline mixture substantially enriched in meta- and ortho-xylene.

The solid para-xylene clathrate is then contacted with 100 volumes of thiophene and 50 volumes of gamma-picoline in admixture at about 200° C. and an absolute pressure of about 130 mm. of Hg over the solid clathrated bed. The extract phase is collected in a series of portions or cuts each containing about 25 volumes. Table 1 gives the composition of the xylene portion of extract cuts 1 to 6 illustrating the selectivity obtained. Substantially all of the xylene is displaced with thiophene at the conclusion of cut 6.

Table 1

| Cut No. | Composition of Xylene Portion of Extract, volume percent | | |
|---|---|---|---|
| | para | meta | ortho |
| 1 | 29 | 67 | 4 |
| 2 | 65 | 31 | 4 |
| 3 | 93 | 7 | |
| 4 | 100 | | |
| 5 | 100 | | |
| 6 | 100 | | |

EXAMPLE II

In this example, 143 volumes of a feed mixture comprising mixed xylenes (27% para, 69% meta, 4% ortho) in admixture with 71 volumes of gamma-picoline is passed in the vapor phase over a lean granular bed comprising the crystalline nickel tetra gamma-picoline dithiocyanate Werner complex. The contacting conditions are maintained at about 80° C. and about 80 mm. absolute pressure. The raffinate phase is collected in a series of cuts each containing about 25 volumes. Table 2 gives the composition of the xylene portion of raffinate cuts 1 to 7, illustrating the separation obtained. About 95 volumes of xylene mixture is recovered in the raffinate phase.

Table 2

| Cut No. | Composition of Xylene Portion of Raffinate, volume percent | | |
|---|---|---|---|
| | para | meta | ortho |
| 1 | | 93 | 7 |
| 2 | 6 | 94 | |
| 3 | | 95 | 5 |
| 4 | 4 | 91 | 5 |
| 5 | 6 | 89 | 5 |
| 6 | 12 | 83 | 5 |
| 7 | 17 | 79 | 4 |

The solid para-xylene clathrate is then vapor phase displacement exchanged with a combination of toluene, thiophene, and gamma-picoline at the feed contacting conditions to yield about 48 volumes of a xylene mixture greatly enriched in paraxylene.

Then, 36 volumes of gamma-picoline and 71 volumes of the xylene feed mixture above is passed over the clathrate bed thereby displacing the thiophene and toluene from the displacement exchange clathrate and yielding a raffinate phase whose xylene portion is greatly enriched in meta- and ortho-xylene.

EXAMPLE III

In another run, conducted in the same manner and at the same conditions as Example I, except that the feed consists of a mixture of cymene isomers (50% para, 20% meta, and 30% ortho) and the displacement exchange fluid is benzene, the cymene portion of the raffinate phase has a substantially reduced para-cymene content. The least clathratable component of the feed mixture is found to be ortho-cymene. When the feed clathrate crystals are subjected to displacement exchange with benzene, the resulting cymene portion of the extract phase is substantially enriched in para-cymene.

EXAMPLE IV

A series of representative separations carried out with a wide variety of organic feeds, Werner complexes, and displacement exchange fluids are shown in Table 3. These separations are conducted in the same manner as shown in Example I. An excess of the nitrogen base component in each of these separations is used corresponding to that used in the Werner complex. The feed contacting and displacement exchange are conducted in the vapor phase at a temperature of about 150° C. and an absolute pressure of about 100 mm. of Hg.

Table 3

| Werner Complex | Feed Components | Selectively Clathrated Component | Displacement exchange fluid |
|---|---|---|---|
| Ni(4-methylpyridine)₄(SCN)₂ | naphthalene, diphenyl | naphthalene | pseudocumene. |
| Do | 1- and 2-methylnaphthalene | 1-methylnaphthalene | mesitylene. |
| Do | ortho- and para-methylanisoles | para | pseudocumene. |
| Do | ortho- and para-nitrotoluenes | do | durene. |
| Do | ortho- and para-toluidine | do | para-xylene. |
| Do | ortho- and para-dichlorobenzenes | do | Do. |
| Do | ortho-, meta-, para-chlorotoluene | do | toluene. |
| Do | ortho-, meta-, and para-xylene | do | Do. |
| Fe(4-methylpyridine)₄(SCN)₂ | do | do | thiophene. |
| Fe(4-ethylpyridine)₄(SCN)₂ | do | do | Do. |
| Mn(4-ethylpyridine)₄(SCN)₂ | do | do | Do. |
| Co(4-methylpyridine)₄(SCN)₂ | do | do | benzene. |
| Ni(4-vinylpyridine)₄(SCN)₂ | do | do | Do. |
| Ni(3-cyanopyridine)₄(SCN)₂ | do | do | Do. |
| Ni(isoquinoline)₄(SCN)₂ | do | do | Do. |
| Ni(4-acetylpyridine)₄(SCN)₂ | ortho-, meta-, and para-xylene and ethylbenzene | ethylbenzene | toluene. |
| Ni(3-ethyl-4-methylpyridine)₄(SCN)₂ | do | meta | Do. |
| Ni(3-amido-pyridine)₄(SCN)₂ | do | para | Do. |
| Ni(ethyl-isonicotinate)₄(SCN)₂ | do | do | Do. |
| Mn(4-ethylpyridine)₄(CNO)₂ | do | ortho | Do. |
| Mn(4-ethylpyridine)₄(CN)₂ | do | do | Do. |
| Mn(4-ethylpyridine)₄Cl₂ | do | do | Do. |
| Ni(4-ethylpyridine)₄(HCOO)₂ | do | do | Do. |
| Ni(4-methylpyridine)₄(NO₂)₂ | do | do | Do. |
| Ni(4-hydroxymethylpyridine)₄(SCN)₂ | do | do | Do. |
| Co(4-ethylpyridine)₄(SCN)₂ | do | para | Do. |

The above examples are illustrative of some of the separations which are possible in vapor phase clathration. Obviously, the complexes mentioned above may be used to separate other mixtures than those shown, and may be interchanged in the various examples. Also, many similar complexes can be substituted for those used in the above examples.

As will be apparent, the process of the invention essentially comprises solids-fluid contacting operations, and any of the various techniques and equipment conventionally applied to such type of operation may be adapted to the practice of the invention without departing from the scope thereof. However, the clathrates formed in the process of the invention are often too friable for moving compact beds or fluidized beds and are in some cases unsatisfactory for continued use in fixed compact beds.

Since these complexes are soluble in a number of solvents, e.g., chloroform, and can be easily crystallized therefrom, it is within the scope of this invention to place a solid support matrix in a solution of the Werner complex so as to deposit the crystalline complexes within the aforesaid matrix. This Werner complex-containing matrix can then be used in fixed compact bed, moving compact bed, or fluidized processes without the disadvantage of excessive attrition. The matrix material, e.g., alumina pellets, alundum balls and the like has better atrition characteristics than either the Werner complex or the clathrates formed therewith.

Thus, while it is often preferred to maintain the clathrate-former in the form of a fixed compact bed, by modifying the clathrate-former as described above, the process can be carried out as a moving bed operation, i.e., as a solids-fluid contacting operation in which a compact bed of the complex is passed successively through feed clathration and displacement exchange clathration zones wherein it is concurrently or countercurrently contacted with the feed stream and the displacement exchange medium, thereby realizing the advantages characteristic of such type of operation, e.g., adaptability to the treatment of multi-component feeds to achieve a high degree of resolution in a single column. Also, the solids-fluid contacting operation may be carried out employing fluidized techniques whereby the complex is employed in a relatively small particle size and is suspended by the flow of the fluid with which it is contacted.

Other modifications and adaptations which would occur to one skilled in this particular art are to be included in the spirit and scope of this invention as defined by the following claims.

We claim:

1. A process for separating a mixture of organic compounds, said mixture including an aromatic compound differing in molecular configuration from another compound in said mixture, which comprises: (1) contacting said mixture in the vapor phase with a preformed solid Werner complex comprising one mole proportion of a salt of a metal of atomic number above 12 coordinated with at least 2 mole proportions of a heterocyclic nitrogen base, said contacting being effected in the presence of a free heterocyclic nitrogen base, whereby there is obtained a mixture of raffinate product lean in said aromatic compound and a solid feed clathrate comprising said Werner complex in clathrate association with said aromatic compound; (2) separating said feed clathrate from said raffinate product; (3) contacting said feed clathrate with a displacement exchange medium in the vapor phase, said contacting being effected in the presence of a free heterocyclic nitrogen base and said displacement exchange medium being a clathratable compound which is readily separable from the components of said mixture, whereby there is obtained an extract product rich in said aromatic hydrocarbon and a solid displacement exchange clathrate comprising said Werner complex in clathrate association with said displacement exchange medium, and (4) separating said extract product from said displacement exchange clathrate, all of said contacting and said separating being conducted in the absence of a liquid phase.

2. A cyclic process for separating a mixture of organic compounds, said mixture including an aromatic compound differing in molecular configuration from another compound in said mixture, which comprises: (1) contacting said mixture in the vapor phase with the solid displacement exchange clathrate from Step (5) comprising a displacement exchange medium in clathrate association with a Werner complex comprising one mole proportion of a salt of a metal of atomic number above 12 coordinated with at least 2 mole proportions of a heterocyclic nitrogen base, said contacting being effected in the presence of a free heterocyclic nitrogen base, whereby there is obtained a raffinate product lean in said aromatic compound and a solid feed clathrate comprising said Werner complex in clathrate association with said aromatic compound; (2) separating said solid feed clathrate from said raffinate product; (3) contacting said solid feed clathrate with a displacement exchange medium in the vapor phase, said contacting being effected in the presence of a free heterocyclic nitrogen base and said displacement exchange medium being a clathratable compound readily separable from the components of said mixture whereby there is obtained an extract product rich in said aromatic compound and a solid displacement exchange clathrate comprising said Werner complex in clathrate association with said displacement exchange medium; (4) separating said extract product from said solid displacement exchange clathrate; (5) returning said solid displacement exchange clathrate to Step (1); (6) separately treating said extract and raffinate products to separate said displacement exchange medium and said free heterocyclic nitrogen base therefrom; (7) returning the separated displacement exchange medium to Step (3); and (8) returning the separated free heterocyclic nitrogen base to Steps (1) and (3), all of said separating in Steps (2) and (4) and all of said contacting being conducted in the absence of a liquid phase.

3. A process according to claim 2 wherein said Werner complex has the general formula $X \cdot Z_y \cdot A_n$ wherein X is a metal having an atomic number above 12, Z is a heterocyclic nitrogen base, $y$ is a number from 2 to 6, A is a monovalent negative radical, and $n$ is a number from 1 to 3.

4. A process according to claim 2 wherein said Werner complex is essentially a dithiocyanate of a metal having an atomic number from 25 to 28 coordinated with four mole-proportions of a heterocylic nitrogen base, and wherein said mixture of organic compounds comprises para-xylene and at least one member selected from the group consisting of ortho-xylene, meta-xylene and ethyl-benzene.

5. A process according to claim 2 wherein said heterocyclic nitrogen base is a 4-substituted pyridine.

6. A process according to claim 3 wherein said mixture of organic compounds comprises at least two aromatic hydrocarbons differing in molecular configuration.

7. A process according to claim 3 wherein said mixture of organic compounds comprises at least two isomeric dialkyl-benzenes.

8. A process according to claim 3 wherein said mixture of organic compounds comprises para-xylene and at least one member selected from the group consisting of ortho-xylene, meta-xylene and ethyl-benzene.

9. A process according to claim 3 wherein said negative radical is thiocyanate.

10. A process according to claim 3 wherein said negative radical is cyanate.

11. A process according to claim 3 wherein said mixture of organic compounds consists essentially of para-cymene and at least one member selected from the group consisting of meta-cymene and ortho-cymene.

12. A process according to claim 3 wherein both of said contacting steps are effected under substantially the same conditions of temperature and pressure.

13. A process as defined by claim 3 wherein, in Step (1), said displacement exchange clathrate is moved through a feed clathration zone in contact with said mixture of organic compounds, and in Step (3) said feed clathrate is moved through an exchange clathration zone in contact with said displacement exchange medium.

14. A process according to claim 3 wherein said mixture of organic compounds and said displacement exchange medium are continuously passed in alternation through at least two zones containing said Werner complex.

15. A process according to claim 3 wherein said heterocyclic nitrogen base is a substituted pyridine.

16. A process according to claim 4 wherein said metal is cobalt.

17. A process according to claim 4 wherein said metal is iron.

18. A process according to claim 4 wherein said metal is manganese.

19. A process according to claim 4 wherein said metal is nickel.

20. A process according to claim 5 wherein said mixture of organic compounds comprises at least two aromatic hydrocarbons differing in molecular configuration.

21. A process according to claim 15 wherein said mixture of organic compounds comprises at least two aromatic hydrocarbons differing in molecular configuration.

22. A process according to claim 15 wherein said mixture of organic compounds comprises para-xylene and at least one member selected from the group consisting of ortho-xylene, meta-xylene and ethyl-benzene.

23. A process according to claim 18 wherein said heterocyclic nitrogen base is a substituted pyridine.

24. A process according to claim 18 wherein said heterocyclic nitrogen base is 4-methylpyridine.

25. A process according to claim 19 wherein said heterocyclic nitrogen base is a substituted pyridine.

26. A process according to claim 19 wherein said heterocyclic nitrogen base is 4-methylpyridine.

27. A process for separating a mixture of organic compounds, said mixture including an aromatic compound differing in molecular configuration from another compound in said mixture, which comprises: (1) contacting said mixture in the vapor phase with a preformed solid Werner complex comprising one mole proportion of a salt of a metal of atomic number above 12 coordinated with at least 2 mole proportions of a heterocyclic nitrogen base, said contacting being effected in the presence of a free heterocyclic nitrogen base, whereby there is obtained a mixture of raffinate product lean in said aromatic compound and a solid feed clathrate comprising said Werner complex in clathrate association with said aromatic compound; and (2) separating said feed clathrate from said raffinate product, all of said contacting and said separating being conducted in the absence of a liquid phase.

28. A process according to claim 27 wherein said Werner complex is essentially a dithiocyanate of a metal having an atomic number from 25 to 28 coordinated with four mole-proportions of a heterocyclic nitrogen base.

References Cited in the file of this patent

UNITED STATES PATENTS

| 2,445,520 | Francis et al. | July 20, 1948 |
| 2,456,723 | Beach | Dec. 21, 1948 |
| 2,798,891 | Schaeffer | July 9, 1957 |

OTHER REFERENCES

Dennis et al.: "Gas Analysis," pub. by The MacMillan Company, New York, pp. 337–41 (1929).